(12) United States Patent
Song et al.

(10) Patent No.: US 9,207,921 B2
(45) Date of Patent: *Dec. 8, 2015

(54) FAULT TOLERANT COMPILATION WITH AUTOMATIC OPTIMIZATION ADJUSTMENT

(75) Inventors: Yonghong Song, Palo Alto, CA (US); Spiros Kalogeropulos, Los Gatos, CA (US); Partha P. Tirumalai, Fremont, CA (US)

(73) Assignee: ORACLE AMERICA, INC., Redwood City, CA (US)

( * ) Notice: Subject to any disclaimer, the term of this patent is extended or adjusted under 35 U.S.C. 154(b) by 1897 days.

This patent is subject to a terminal disclaimer.

(21) Appl. No.: 12/488,905

(22) Filed: Jun. 22, 2009

(65) Prior Publication Data

US 2010/0325619 A1    Dec. 23, 2010

(51) Int. Cl.
*G06F 9/45*     (2006.01)
*G06F 11/36*   (2006.01)

(52) U.S. Cl.
CPC .............. *G06F 8/443* (2013.01); *G06F 8/43* (2013.01); *G06F 11/3624* (2013.01)

(58) Field of Classification Search
CPC ............. G06F 8/42; G06F 8/43; G06F 8/443; G06F 11/3624
USPC .......... 717/125, 127, 139–161; 714/E11.217, 714/38.1; 712/244, E9.05
See application file for complete search history.

(56) References Cited

U.S. PATENT DOCUMENTS

| | | | |
|---|---|---|---|
| 5,367,696 A * | 11/1994 | Abe .............................. | 717/153 |
| 5,371,747 A * | 12/1994 | Brooks et al. ................ | 714/38.1 |
| 5,375,242 A * | 12/1994 | Kumar et al. ................. | 717/147 |
| 5,396,631 A * | 3/1995 | Hayashi et al. .............. | 717/159 |
| 5,481,708 A * | 1/1996 | Kukol ........................... | 717/155 |
| 5,675,803 A | 10/1997 | Preisler et al. | |
| 5,805,895 A * | 9/1998 | Breternitz et al. ........... | 717/160 |
| 5,815,713 A * | 9/1998 | Sanders ........................ | 717/106 |
| 5,909,580 A | 6/1999 | Crelier et al. | |

(Continued)

OTHER PUBLICATIONS

Anonymous, Offending routines identifying method for use during compiler optimization, involves automating binary search in tracing subroutines or functions, which fail when optimization level of compiler is increased, May 2003.*

(Continued)

*Primary Examiner* — Qing Chen
(74) *Attorney, Agent, or Firm* — Marsh Fischmann & Breyfogle LLP; Kent A. Lembke (57) ABSTRACT

A compilation method is provided for correcting compiler errors that include compiler internal errors and errors produced by running a validation suite. The method includes running a compiler on a computer and storing a set of optimization levels in memory accessible by the compiler. The method includes receiving a source file with the compiler that includes a user-defined optimization level to be used in compiling the source file. The method includes identifying a set of functions within the source file and using compiler components to compile these functions using the original optimization level. When the compiling results in an internal error occurring and being reported for one or more of the functions, the method includes using an optimization adjustment module to process the internal error and assign an adjusted or lower optimization level to the one or more functions and recompiling of these functions again with the lower optimization level.

15 Claims, 5 Drawing Sheets

(56) References Cited

U.S. PATENT DOCUMENTS

| | | | |
|---|---|---|---|
| 5,956,513 A | 9/1999 | McLain, Jr. | |
| 5,960,202 A * | 9/1999 | Granston | G06F 8/41 717/141 |
| 5,966,537 A * | 10/1999 | Ravichandran | 717/158 |
| 5,966,538 A * | 10/1999 | Granston et al. | G06F 8/443 717/158 |
| 5,995,754 A * | 11/1999 | Holzle et al. | 717/158 |
| 6,014,516 A * | 1/2000 | Nishiumi | 717/154 |
| 6,044,475 A * | 3/2000 | Chung et al. | 714/15 |
| 6,072,951 A * | 6/2000 | Donovan et al. | 717/158 |
| 6,074,433 A * | 6/2000 | Haraguchi et al. | 717/160 |
| 6,075,942 A * | 6/2000 | Cartwright, Jr. | 717/138 |
| 6,105,148 A * | 8/2000 | Chung et al. | 714/16 |
| 6,113,651 A | 9/2000 | Sakai et al. | |
| 6,149,318 A | 11/2000 | Chase et al. | |
| 6,286,135 B1 * | 9/2001 | Santhanam | 717/146 |
| 6,298,479 B1 | 10/2001 | Chessin et al. | |
| 6,434,742 B1 | 8/2002 | Koepele, Jr. | |
| 6,658,656 B1 * | 12/2003 | Thompson | 717/151 |
| 6,671,877 B1 * | 12/2003 | Ogasawara | 717/158 |
| 6,708,288 B1 * | 3/2004 | Ziegler et al. | 714/15 |
| 6,820,254 B2 * | 11/2004 | Smith et al. | 717/151 |
| 6,848,098 B1 * | 1/2005 | Tsuboi | 717/151 |
| 6,971,091 B1 * | 11/2005 | Arnold et al. | 717/145 |
| 7,062,755 B2 | 6/2006 | Partamian et al. | |
| 7,065,676 B1 * | 6/2006 | Lang et al. | 714/33 |
| 7,146,607 B2 * | 12/2006 | Nair et al. | 717/151 |
| 7,562,351 B2 | 7/2009 | Haas et al. | |
| 7,810,071 B2 * | 10/2010 | Thebes et al. | 717/124 |
| 7,810,081 B2 | 10/2010 | Dickenson et al. | |
| 7,904,756 B2 | 3/2011 | Dilman et al. | |
| 8,095,829 B1 | 1/2012 | Coon et al. | |
| 8,108,849 B2 * | 1/2012 | Adolphson et al. | 717/152 |
| 2002/0092002 A1 | 7/2002 | Babaian et al. | |
| 2002/0188932 A1 | 12/2002 | Hundt et al. | |
| 2003/0023961 A1 * | 1/2003 | Barsness et al. | 717/152 |
| 2003/0037318 A1 | 2/2003 | Ramasamy et al. | |
| 2004/0003335 A1 * | 1/2004 | Gertz et al. | 714/758 |
| 2004/0034814 A1 * | 2/2004 | Thompson | 714/35 |
| 2004/0049769 A1 * | 3/2004 | Lueh et al. | 717/158 |
| 2004/0078687 A1 | 4/2004 | Partamian et al. | |
| 2004/0098713 A1 * | 5/2004 | Ogawa et al. | 717/160 |
| 2004/0103406 A1 | 5/2004 | Patel | |
| 2005/0203643 A1 * | 9/2005 | Jackson et al. | 700/51 |
| 2005/0223363 A1 * | 10/2005 | Black-Ziegelbein et al. | 717/127 |
| 2006/0080647 A1 | 4/2006 | Bhansali et al. | |
| 2006/0101420 A1 | 5/2006 | Shinnar et al. | |
| 2006/0161903 A1 | 7/2006 | Anand et al. | |
| 2007/0006157 A1 * | 1/2007 | Haraguchi et al. | 717/124 |
| 2007/0011655 A1 * | 1/2007 | Tumati | 717/122 |
| 2007/0033581 A1 * | 2/2007 | Tomlin et al. | 717/154 |
| 2007/0061793 A1 * | 3/2007 | Inglis et al. | 717/151 |
| 2007/0245322 A1 | 10/2007 | Anand et al. | |
| 2008/0052695 A1 | 2/2008 | Dickenson et al. | |
| 2009/0007093 A1 | 1/2009 | Lin | |
| 2009/0049432 A1 * | 2/2009 | Pirvu | 717/148 |
| 2009/0055821 A1 * | 2/2009 | Grcevski et al. | 718/1 |
| 2009/0313600 A1 * | 12/2009 | Ayers et al. | 717/106 |
| 2010/0011026 A1 | 1/2010 | Saha et al. | |
| 2010/0175056 A1 * | 7/2010 | Ogawa et al. | 717/151 |
| 2010/0325618 A1 | 12/2010 | Song et al. | |
| 2010/0325619 A1 * | 12/2010 | Song et al. | 717/143 |
| 2011/0131559 A1 | 6/2011 | Young et al. | |

OTHER PUBLICATIONS

Bruening et al., An Infrastructure for Adaptive Dynamic Optimization, 2003.*
Arnold et al., Adaptive Optimization in the Jalapeno JVM, 2000.*
Necula, Translation Validation for an Optimizing Compiler, 2000.*
John R. Levine, Linkers and Loaders, 2000, Morgen Kaufmann, pp. 10-12.*
Darren Lee Buttle, Verification of Compiled Code, 2001.*
Levine, Jr., "Linkers and Loaders, Chapter 1 Linking and Leading," Morgan Kaufmann, pp. 10-11, 2000 by Academic Press.

* cited by examiner

FAULT TOLERANT COMPILATION WITH AUTOMATIC OPTIMIZATION ADJUSTMENT

CROSS-REFERENCE TO RELATED APPLICATIONS

This application is related to co-pending U.S. patent application Ser. No. 12/488,710, entitled "Fault Tolerant Compilation With Automatic Error Correction," incorporated herein by reference in its entirety.

BACKGROUND

1. Field of Description

The present description relates, in general, to compilers and compilation methods, and, more particularly, to a compiler and compilation method that provide automated correction of errors detected or occurring during compilation of an input file in a source language to a compiled output file in a target language, e.g., to provide output in the form of executable code or binary (in many cases, errors are corrected by the compiler or compilation method without user intervention/action).

2. Relevant Background

In general form, a compiler is a program that is run on a computer that accepts as input a program text in a certain language and produces as output a program text in another language. For example, the input or source language may be C++, Java, or some other programming language while the target language may be machine code (or executable code) for a particular manufacturer's processor series. The part of a compiler that performs the analysis of the source language text is called the front-end and the part that does the target language synthesis is the back-end. Modern compilers often include a compiler driver that invokes and coordinates processing by the front-end and back-end components such as lexical and syntax analysis components or parsers, context handlers such as linkers, and other components or modules.

Currently, when users of a compiler try to compile an application they have written, the compilation process will simply stop when an error occurs or is detected by one or more of the components/nodules invoked by the compiler driver. Specifically, the compiler may stop the compilation process when a syntax error is detected by a syntax parser, when a linker error is found by a linker, and when other errors are detected. When the compilation process is stopped, the compiler (or compiler driver) may generate a message for display to a programmer/user (or for print out) to notify programmers/users of the compiler that some errors stopped the compilation. The compiler may include a module or toot to provide some level of syntax error detection that may be reported in the error messages or in a report provided to the programmer, and some compilers may flag syntax errors in the source edit window as users are editing their codes.

After compilation has stopped and an error report has been generated by the compiler, the programmers/users have to examine the error messages to try to identify a problem in their source file. Once a problem is tentatively identified by examining the compiler error report, the programmer may attempt to fix the problem(s) by modifying the source file and restarting the compilation process with the modified source file. This iterative process is repeated until the compilation is successful or no viable solution is found or available to achieve successful compilation. As any programmer will attest, the compilation and program debugging process may be very lengthy or time consuming and often frustrating as even minor errors can cause compilation to crash or halt in midstream.

SUMMARY

Briefly, a compiler is described that in some embodiments is restructured to include an error corrector module that is used by the compiler driver to automatically correct user errors in a source file (e.g., a user's program code presented for compilation). During use, the compiler driver passes error messages and error context information from compiler components such as syntax parsers, linkers, and the like to the error corrector module. The error corrector module accesses an error correction database using the error message information and/or the context information to identify one or more error corrections/changes to the compilation environment or original source file. The source file is modified by the compiler driver in an attempt to address the error, and compilation is continued with the compiler components to produce a compiler output or binary.

In other embodiments, the compiler is restructured to automatically handle internal compiler errors that may result due to optimization processes (e.g., compiler internal failures, validation errors produced upon running a validation suite, and the like). In these embodiments, the compiler may include an optimization adjustment module (which may be an interface for the compiler driver), and the compiler driver or the adjustment module may divide a received source file into a plurality of functions. The compiler driver uses the functions of the source file as the compilation units that are passed to the compiler components along with an optimization level, which may be initially set at a user-selected optimization level for the entire source file. When a compiler component identifies an internal error, the error is reported to the compiler driver along with a function identifier such that the driver knows which particular function was being compiled when the internal error was experienced. At this time, the optimization adjustment module may determine whether there are lower levels of optimization available for the function, and if so, act to select a lower or less aggressive level of optimization for the particular function. The compiler driver may then act to attempt compilation again for this function but at the lower optimization level. Such a process is repeated until compilation is successful for the function or compilation is unsuccessful even at the lowest optimization level. Such an automated optimization adjustment process is performed for each function, in some embodiments, and the output of the compiler may include a report indicating the changes of optimization level used for each function to obtain a final output or binary (or to report which functions could not be properly compiled). A compiler may be provided that includes the error corrector module and the optimization adjustment module such that both user errors and internal errors are automatically corrected (e.g., without user intervention/action) during compilation rather than having a compiler simply stop compilation each time any error is detected.

When a validation suite or tool is provided, the validation test suite may be run with the generated binary. If the results validate, the binary and optimization level change information may be output or presented to a user/programmer and the compilation process completes successfully. If the validation fails, the driver may try to recompile the application using the following approach. The driver using the optimization adjustment module, for example, may lower the optimization level for certain functions in the file and produce a new binary. The validation and reduction in optimization level for one or more functions is repeated until the validation process succeeds or the lowest optimization level is applied for all functions.

More particularly, a compilation method is provided for error correction that may be carried out by a compiler running on a computer system used by a programmer or other user for compiling program code (e.g., transformation of a source file in a first language to a binary or output file in a second language such as a machine language). The method includes using a compiler driver run by a processor of a computer system to receive a source file for compilation. Then, with a compiler component invoked by the compiler driver, the method includes identifying an error in the source file such as a linking problem or syntax error in the user's program. The method may further include receiving with the compiler driver an error message corresponding to the identified error from the compiler component. Then, with an error corrector module run by the processor, the method may include processing the error message to determine an error correction for the identified error in the source file. The compiler driver may then modify the source file based on the error correction and then the method may involve compiling the modified source file with the compiler component to generate a binary or set of executable code.

The compiler component may include a syntax parser and the identified error may be a syntax error in the source file. In such cases, the processing of the error message may include querying an error correction database with the syntax error to retrieve a syntax correction and further modifying the source file may include altering syntax of the source file. In the method, the compiler component may be a linker and the identified error may be a linking error. Then, the receiving by the compiler driver may include receiving error context information corresponding to the linking error. In such cases, the error correction may include a modification of a compilation environment of the source file to modify linking. The method may further include storing a change applied in the modifying step and generating an error correction report including the stored change to the source file. The method may also include storing a set of compilation states including prior states of the source file. When the compiling of the modified source file produces a compilation error, the method may then include returning to one of the compilation states and repeating the processing step to identify a different error correction for the identified error.

DETAILED DESCRIPTION OF EXEMPLARY EMBODIMENTS

The following description describes a compilation method and compiler configuration for providing fault tolerant compilation. The compilation method includes a compiler (or its compiler driver) invoking or using a compilation error corrector when errors are identified or when compiling errors occur during compilation of a source file (e.g., an original source file provided by a programmer when calling a compiler). For example, a syntax or linking error may be found during compilation, and the compiler driver may pass the error along with error context information to the compilation error corrector. The compilation error corrector may process the error with the error context information to identify one or more suggested corrections to overcome the error, such as by performing a look up in an error correction database or the like. The suggested corrections or modified compilation environment are then passed back to the compiler driver for another attempt at compilation of the source file (e.g., after it is modified based on the suggestion(s) or the like). If the error is not successfully corrected or another error is identified by the compiler driver (or invoked compilation components such as a linker), the process of error correction may be repeated until successful compilation is completed or until an error is encountered/identified that cannot be corrected automatically or without user intervention by the error corrector.

Figure 1:
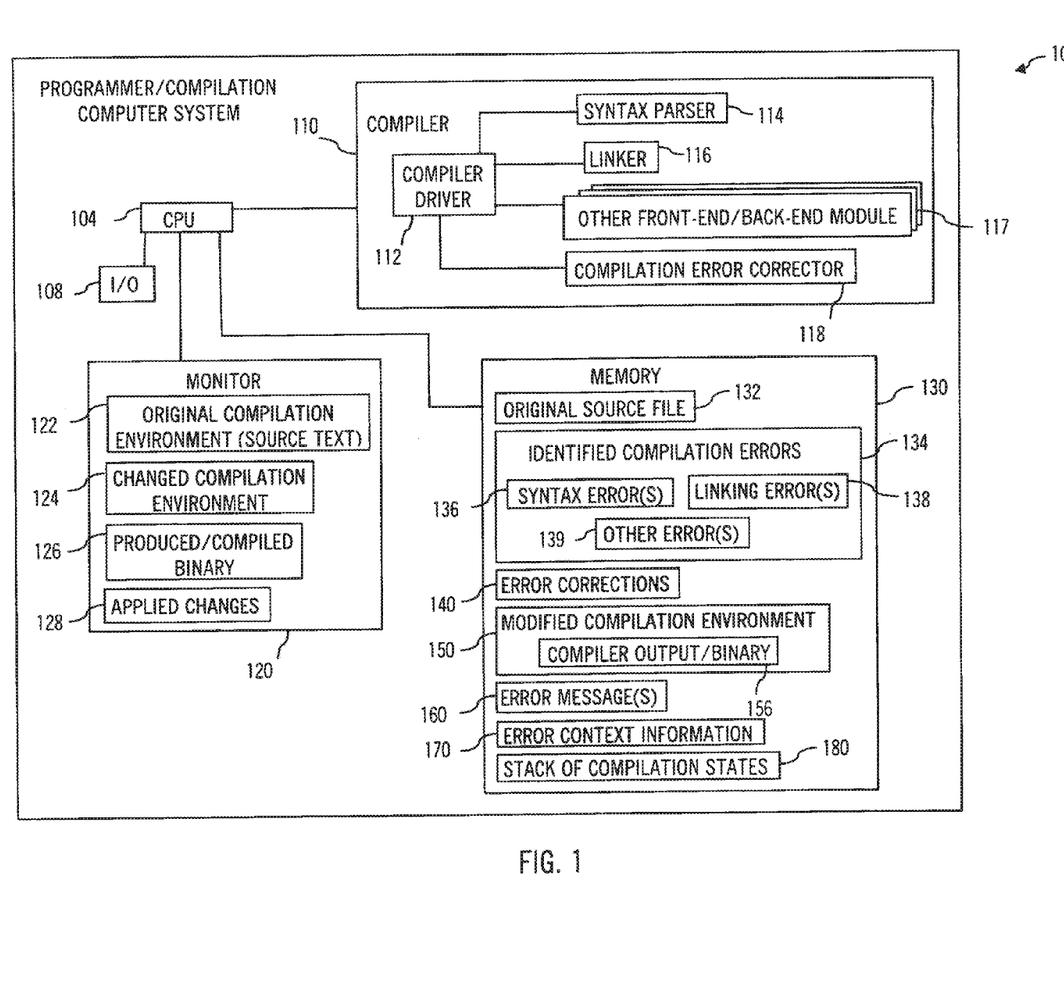
FIG. 1 illustrates in functional block form a computer or computer system that may be used by a programmer or other user to compile a source file according to an embodiment described herein that utilizes a compilation error corrector in or accessed by a compiler.

FIG. 1 illustrates a programmer/compilation computer system 100 that may be used to perform the compilation methods taught herein. The computer or computer system 100 may take a wide variety of forms to practice the invention but generally may include processor 104 that runs software or program modules such as a compiler 110 to perform particular functions (e.g., the computer 100 may be thought of as a special-purpose machine adapted for compiling source files 132). The processor 104 also controls operation of input/output (I/O) devices 108 such as keyboards, a mouse, a touch screen, and the like that allow a programmer/user of system 100 to enter data such as to enter or select an original source file 132 for a program in a first or source language and to call the compiler 110 to compile the source file 132 to produce a set of executable code (e.g., a compiled binary or output file in a second or target language) 126. The I/O devices 108 may also include a printer used to print out a set of error messages, a changed compilation environment 124, a compiled binary 126, applied changes to the original source file 128, and the like. The system 100 further may include one or more display or monitor devices 120 that are used to display information to the user/programmer, and this displayed or reported information may include the source text or original compilation environment 122, the changed compilation environment 124 used to achieve successful compilation of an original source file 132, a produced/compiled binary 126 generated by the compiler 110, and changes 128 applied by the compiler driver 112 to the original source file 132.

As shown, the compiler 110 may include a compiler driver 112 that controls or performs compilation of an original source file 132 provided by a programmer/user of system 100 and at least temporarily stored in memory 130 of system 100. The compiler driver 112 and other components of compiler 110 may be stored in computer readable storage medium or otherwise be run by CPU 104 to cause the computer 100 to perform certain functions as described herein (e.g. to parse the original source file 132 for errors, to translate the source file 132 from a first/source language to a second/target language, to identify errors and provide suggested corrective courses/actions such as to change/modify the compilation environment, and other functions/processes). The compiler 110 may include a number of components (e.g., front-end and back-end components) to perform compilation and/or translation function such as a syntax parser(s) 114, a linker(s) 116, and other front-end/back-end modules 117. During operation, these modules 114, 116, and 117 may be invoked by the compiler driver 112, and the modules may generate or return a set of identified compilation errors 134 that may be stored in memory 130 by the driver 112. The errors may include syntax errors 136, linking errors 138, and other errors 139 that may prevent successful translation of the source file 132 to executable code by a target processor/system.

The compiler driver 112 may pass these identified compilation errors or error reports 134 from the compiler modules 114, 116, 117 along with error context information to a compilation error corrector 118 provided in the compiler 110 (e.g., additional software component run by the CPU 104 or accessible by CPU 104). The compilation error corrector 118 may process the reported errors 134 and context information and perform a look up to a set of error corrections/suggestions 140 that may be stored in system memory 130 (or otherwise be accessible to the corrector 118 such as by the system 100 linking to another data store via a wired or wireless network). The compilation error corrector 118 may act directly to create a modified compilation environment 150 that the compiler 110 may compile with driver 112 or the suggested changes/corrections may be passed by the corrector 118 to the compiler driver 112 to create a modified source file for compiling. The compiler driver 112 may then act to attempt to compile the modified source file/environment 150 to create a compiler output or executable code binary) 156. During this process, data may be stored in memory 130 such as an error message(s) 160 as may be provided by compiler components 114, 116, 117, error context information 170 as may be provided by these same components or by driver 112, and a stack of compilation states 180 that may be tracked by the compilation error corrector 118 so as to allow the corrector to return to a previous state or states when/if a correction is unsuccessful (i.e., does not result in successful compilation by driver 112).

The compiler 110 and/or other software may be run by processor 104 to generate printed or other reports to a programmer/user of system 100. For example, the compiler 110 functions to display on the monitor 120 the original compilation environment 122, the changed or changes to the compilation environment 124, a produced/compiled binary (or executable code product) 126, and/or any applied changes 128.

As can be seen, a compiler configured as described herein may provide fault-tolerant compilation with automatic error correction provided by the compilation error corrector 118. Briefly, a compilation error corrector (such as corrector module 118) may be implemented that is especially designed to cope with readily corrected errors such as syntax errors and linking errors. If any such error happens, the compiler driver (such as driver 112) may pass the error message(s) and error context information to the error corrector (such as module 118). The error corrector then may try to make changes to the compilation environment (e.g., to implement error corrections 140 to produce a modified compilation environment 150). Such modification may involve changing the original source file 132, addressing compilation flags, changing environment variables, and the like. In many cases, such changes will allow compilation to be successfully carried out with the modified compilation environment with no user/programmer involvement (e.g., automatic correction of readily identified and fixed programming errors). Eventually, the changed compilation environment and the produced binary may be presented to the user (such as via monitor 120 as shown at 124 and 126 or via an I/O device 108).

The automatic error correction scheme provided, for example, by computer 100 of FIG. 1, is a useful approach that may embed human knowledge in use of the error corrector (such as by defining a set of error corrections 140 that address a large percentage of common correctable error types and one or more suggested corrective actions for each error). Systems and methods implemented based on this description provide a compilation framework that supports automatic error correction with certain types of compilation errors (e.g., provides a compilation error corrector that causes a computer to attempt to fix certain compilation errors in an iterative and automated manner). A compiler may be used to automatically correct syntax, linking, or other errors and then continue with the compilation (rather than simply stopping and reporting an error) and then present the final binaries to the user/programmer.

Figure 2:
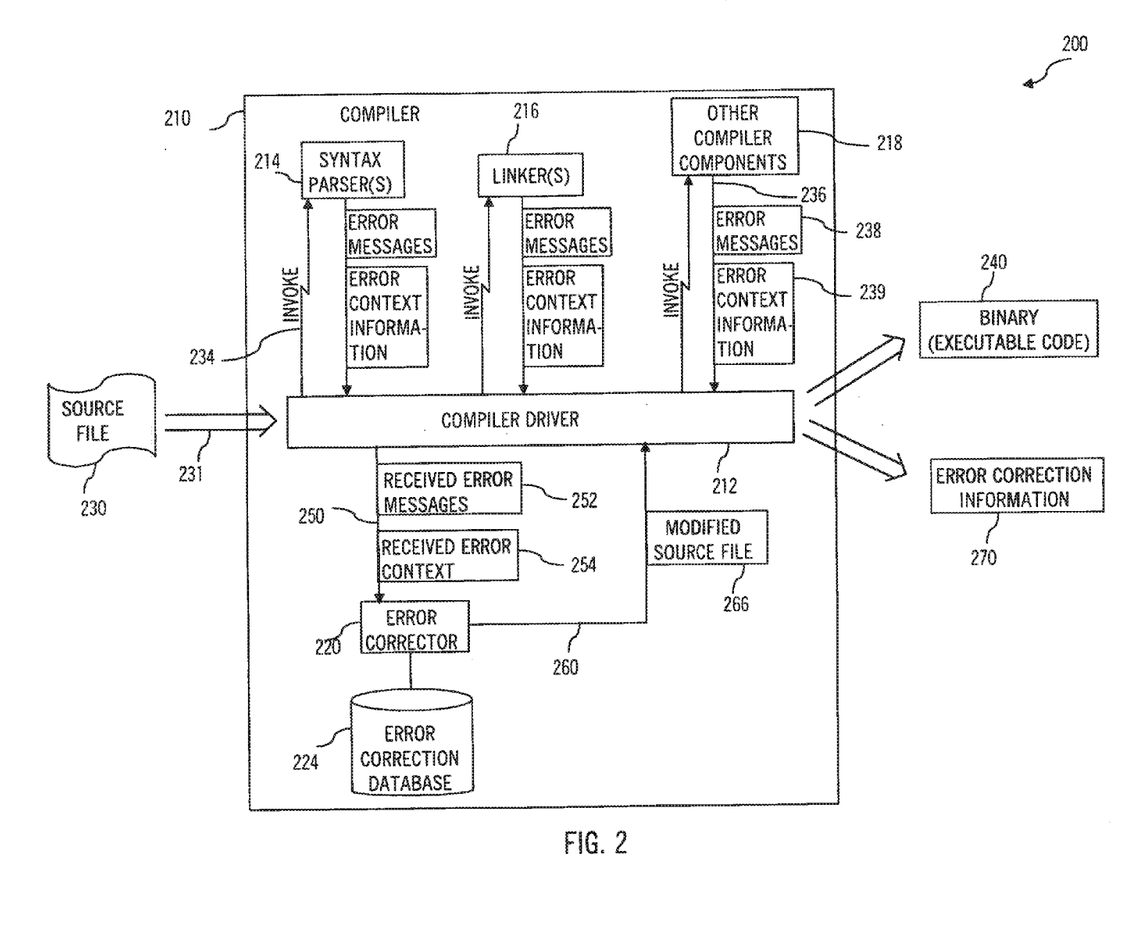
FIG. 2 illustrates a compilation method and/or compilation data flow of an embodiment such as may be carried out by operation of the system of FIG. 1.

FIG. 2 illustrates a compilation method 200 that implements an automated correction scheme. A compiler 210 is provided as may be implemented with software, firmware, and hardware in a computing device, and the compiler 210 includes a compiler driver 212. As with many modern compilers, the compiler 210 may be implemented with several components such as front-end and back-end components that are invoked and coordinated by the compiler driver 212. For example, the compiler driver 212 may receive 231 a source file 230 for compilation and respond by invoking 234 a syntax parser(s) 214, a linker(s) 216, and/or other components 218 useful for translating or compiling a source file 230. These components 214, 216, 218 return error messages 238 and error context information 239 when compilation is unsuccessful or user errors are detected in source file 230. The compiler driver 212 transmits/passes 250 the received error messages 252 and received error context information 254 to an error corrector 220. The error corrector 220 may query an error correction database 224 to obtain possible corrections to the compilation environment/source file, and a modified source file or error correction suggestions 266 may be returned to the compiler driver 212. Compilation is then restarted automatically (without programmer intervention) and a binary (executable code) 240 is output to the user/programmer along with (in some cases) a set of error correction information 270 (e.g., modified source file, applied changes, identified/corrected errors, and the like).

As shown in FIGS. 1 and 2, a compiler may be restructured to provide the automatic error correction features described herein. During use of such a restructured compiler (i.e., during compilation), if any error occurs, one or more of the various compiler components (e.g., a syntax parser, a linker, and so on) may pass an error message(s) and error context information (e.g., a file name associated with the error, a function name in which the error was detected, a line number, and so on) to the compiler driver. The driver may then coordinate with the error corrector to examine and try to fix the error. For example, the error corrector may accept the error message(s) and error context as inputs from the compiler driver. Then, the error corrector may examine the error message(s) and make one or more changes to the compilation environment. Such changes may include a source code change, a flag change, an environment variable change, and the like, and the corrector may then send the change or changed environment/source code to the compiler driver. After receiving the updated compilation environment from the error corrector, the compiler driver may attempt compilation based on the new compilation environment.

In some cases, the compilation error corrector may implement or utilize human knowledge and prior error correction experiences. This may be achieved with proper or careful creation of error correction listings/databases that may be used by the corrector to find suggested corrective actions for errors defined/identified in compiler component error reports/messages. In a simple example, a parser may find that a "{" (e.g., a bracket or parenthesis) is missing in the source code being compiled and provide a corresponding error message.

The error corrector may query a correction database with this received error to find a suggested correction such as to put a "{" in the missing place that may be presented to the compiler driver (or used to directly change the compilation environment). In another case, a parser may identify an undefined variable and report this in an error message. The error corrector may respond by performing inference analysis in order to decide the type of the variable, and then the corrector may define (or suggest) such a fix in the beginning of a procedure or globally (depending on the particular variable context). Of course, numerous other parser-type errors may be processed and corrected by an error corrector.

The error corrector may also address or correct linking errors. For example, a linker may not be able to find a library in a library search path of a source code. In such a case, the error corrector may be configured to check whether it can find a library with a similar name, and the corrector may then suggest that library to the compiler driver. In another linking error example, linking may fail due to some undefined functions. In this example, the error corrector may be designed to search some common system libraries to check whether any definitions satisfy the linking. If so, the corrector may suggest to the compiler driver that such a system library be added or used at the linking line/location in the source code.

In practice, the error corrector may maintain a stack of compilation environment states to record past suggested changes or corrections provided to the compiler driver. Such tracking of compilation environment states allows the corrector to present all applied changes to the programmer/user (e.g., as part of an error correction report or the like) The environment state tracking also allows the error corrector to back track past suggestions/states so as to apply new suggestions or error corrections. For instance, this may allow the error corrector to avoid attempting to apply an identical fix/correction to the same problem repeatedly or in an infinite loop.

For each compilation problem, in some cases, the corrector may maintain one corresponding compilation environment state (e.g., stored in system or accessible memory). Each state may maintain or include a list of attempts by the error corrector in order to fix the problem. In a case of continuous or ongoing failure to fix a compilation problem, the error corrector may try a different fix or corrective action. If after a preset number of attempts or when possible corrective actions have been exhausted, the corrector may restore the compilation environment to the previous state. If there is no previous state to restore (e.g., back to the original state/source code), the corrector may notify the compiler driver to stop the compilation process and present the original error messages to the user/programmer. The error corrector database or tracking data in memory may also be used to train the error corrector to fix similar problems identified in future compilation processes efficiently by leveraging the information recorded in the database.

Figure 3:
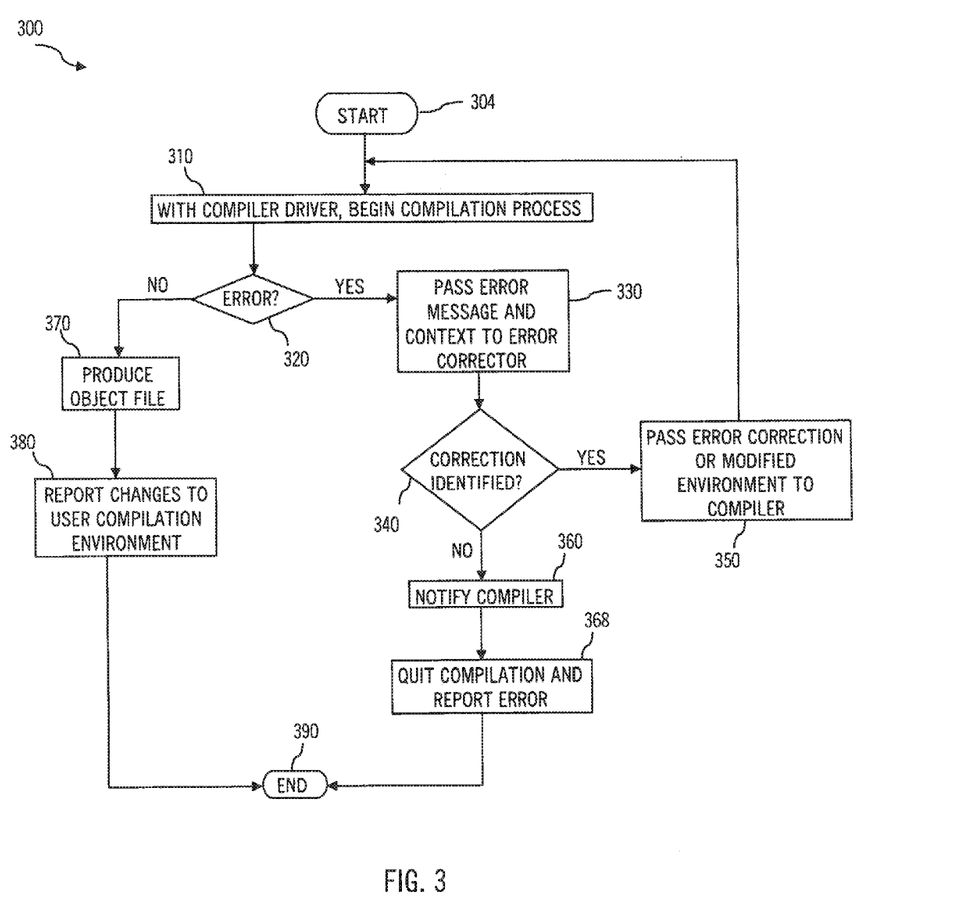
FIG. 3 is an exemplary compilation method as may be performed by the computer system of FIG. 1 or the compiler of FIG. 2.

FIG. 3 illustrates an example of a compilation method 300 that utilizes automatic error correction. For example, the computer 100 of FIG. 1 may be operated to perform the compilation method 300. The method 300 starts at step 304 such as with loading a compiler with a compilation error corrector upon a computer that is going to be used to compile a user's source code/file. At step 304, a database or listing of error corrections may be stored in the computer's memory or otherwise made accessible to the compiler (e.g., via a network connection for the computer). At 310, the compilation process is begun by a compiler driver of the compiler on a received or input original source file (e.g., program code in a source language) or on some input files.

At 320, the method 300 continues with the compiler driver determining whether compilation was successful with the original source file or whether one or more error messages along with error context information was received from a parser, a linker, or other compiler component processing the source file. If there was any error (e.g., syntax error, linking error, or other error), the method 300 continues at 330 with the compiler driver passing the error message and related error context to the error corrector. At 340, the error corrector attempts to find a solution for the error (e.g., by performing a query with an error definition in the error message on a corrections database). If the corrector finds a suggestion/correction at 340, the corrector at 350 passes the error correction or modified compilation environment to the compiler.

Once the suggestion/correction is received by the compiler, the compiler driver at 310 may try to recompile the program with the suggested changes. If the compilation is unsuccessful, the method 300 continues with repeating step 330. If compilation is successful as determined at 320, the method 300 continues at 370. Returning to step 340, if the error corrector cannot find a solution or correction to the error (or a set number of correction attempts have been performed as may be tracked with a loop counter or the like), the error corrector may at 360 act to notify the compiler driver, and at 368, compilation may be quit and an error report provided to the user/programmer (which may include an identification of the error and attempted corrections/fixes (if any) that proved unsuccessful). The method 300 may then end at 390 or return to step 310 when a next source file(s) is received for compilation.

At 320, the compiler driver may determine that no further errors were found and compilation was successful for the program/source file. In this case, at 370, an object file or final binary is produced by the compiler. Then at 380, the driver may act to report what changes have been made to the user compilation environment, with reporting being made in any of a number of ways such as with a print out, a display/report provided on a monitor or display device, and so on. The reporting may include a list of attempted corrections that led to successful compilation or, in some cases, may only provide a report indicating the successful corrections that resulted in a source file that was successfully compiled by the compiler.

At this point in the description, it may be useful to provide a pseudo-code example of automatic error correction, which may be performed within a system 100 such as at least in part by compilation error corrector 118.

Auto-Correction Example

```
$ cat foo.c
void gather(double *, double *);
int main( ) {
  int i, j, count1;
  double *x, *y;
  x = (double *) malloc(10000);
  y = (double *) malloc(10000);
  gather(x, y);
  for (i=0; i<1000; i++) {
    if ((x[i]>=-1.0)&&(x[i] <=1.0) {
      y[i] = arcsin(x[i]);
      count1++;
    } else {
      count2++;
    }
  }
  printf("count1 = %d count2 = %d\n",count1, count2);
}
```

There are several correctable errors in the above user-provided source file or program. First, the function malloc is a widely known library function. So, #include <stdlib.h> may be added at the beginning as a correction. Second, "A;" is needed at the end of the y= . . . statement. It can be added as a correction. Third, there is an unmatched parenthesis in the if statement, and this can be corrected automatically. Fourth, the variable count2 was not declared. From the context (e.g. the reference to %d in the printf), it can be declared as an integer. Fifth, the identifier arcsin is a typo. The call for the mathematical function arcsin is asin. This fifth error correction may require #include <math.h> at the beginning as well as "-lm" in the compilation environment. After suitable checks, these can be added if necessary. Sixth, printf requires #include <stdio.h> at the beginning and this can be provided.

Currently, compilers simply report the errors and stop. Note that in large codes, not all errors are reported in one pass. So it may require multiple attempts before all errors are discovered such as: S $cdir/current_compiler/bin/ec -O -c foo.c "foo.c", line 6: warning: implicit function declaration: malloc "foo.c", line 9: syntax error before or at: gather "foo.c", line 11: syntax error before or at: {"foo.c", line 14: syntax error before or at: else "foo.c", line 18: warning: function prototype parameters must have types "foo.c", line 18: warning: old-style declaration or incorrect type for: printf "foo.c", line 19: syntax error before or at: }cc: acomp failed for foo.c The automatic correction method described here could operate as follows:
$ $cdir/auto_correcting_compiler/bin/cc -O -c foo.c . . . Errors found in source file and corrected . . . Original source file is saved as foo.c.orig . . . Modified source file successfully compiled . . . See foo.c.cor for report $ cat foo.c

```
#include <stdlib.h>
#include <stdio.h>
#include <math.h>
void gather(double *, double *);
int main( ) {
  int i, j, count1;
  int count2;
  double *x, *y;
  x = (double *) malloc(10000);
  y = (double *) malloc(10000);
  gather(x, y);
  for (i=0; i<1000; i++) {
    if ((x[i]>=-1.0)&&(x[i] <=1.0)) {
      y[i] = asin(x[i]);
      count1++;
    } else {
      count2++;
    }
  }
  printf("count1 = %d count2 = %d\n",count1, count2);
}
```

The systems, compilers, and compilation methods discussed above provide techniques for automatically handling user errors. The following provides systems, compilers, and compilation methods that address internal errors that may occur when compiler components attempt to compile a source or program file. The methods and components may be used in addition to the error corrector discussed above or independently (e.g., a compiler may be provided that includes the optimization adjustment module described herein and not the error corrector (or vice versa) or that includes both of these components). A computer system or compiler that includes the optimization adjustment module may be thought of as providing fault tolerant compilation with automatic optimization adjustment.

Currently, when users try to compile an application, if any error happens, whether it is a syntax error or a compiler internal error, the compilation process will simply stop. The compiler may then print a message to notify users that some errors have forced the compilation to abort. In the following discussion, the description focuses on compiler internal errors. In general, when a user sees a compiler internal error, such as a segmentation fault during compilation process of a file, a floating point exception, or an internal assertion error, the user may respond by trying to reduce the optimization level for the whole compilation process to see whether a workaround can be found. However, such comprehensive changes in the optimization level for a program or source file provided to a compiler may result in significant sacrifices in performance since optimization level is lowered across all of the file or program being compiled, even if the compiler at the lower optimization level can successfully complete the compilation.

In contrast, the following description provides a fault tolerant compilation with automatic optimization level adjustment. To this end, an optimization adjustment module or component may be provided inside a compiler, and this added module may be adapted to cause the optimization level adjustment to happen at a function level (e.g., at a procedure, routine, or subsection of the overall program level) rather than simply changing the optimization level after an error report for the entire program or user file. By implementing the process inside the compiler, the optimization adjustment scheme can better cope with a user build process. By adjusting the optimization level at function granularity, the number of impacted functions may be reduced or even minimized with such adjustment, and, consequently, the potential performance loss by using a lower optimization level to compile a user's code or program is also reduced or even, in some cases, minimized.

Furthermore, after a binary is produced by the compiler using the optimization adjustment module, the user may provide a validation suite to validate the binary (or this may have been provided prior to initiating compilation). If the binary cannot be validated, the compilation driver may be configured to try to lower optimization level(s) for more functions until a good binary is produced. In this manner, a compiler framework is described that does automatic optimization adjustment for compiler internal errors at a function level to minimize performance impact. Previously, there were tools which could be used to adjust the optimization level at file level in an attempt to fix compiler internal errors. However, the optimization adjustment techniques described herein differs in at least two fronts. First, the optimization scheme is implemented inside the compiler. By skipping the tool layer, the existing make files can be used without change. Second, by implementing the scheme inside the compiler, more flexible and complex interfaces can be provided between compiler driver and its components to adjust the optimization level, without revealing the interface to the tools. The optimization level adjustment scheme can work on function level since it is occurring inside the compiler, therefore minimizing potential performance loss.

The modern compiler is often implemented with several components like frontend, backend, and linker, which are all coordinated by a compiler driver. The normal compilation works as follows: the driver takes a set of files and the options, processes the options and invokes its components to do actual compilation and linking. The optimization adjustment process may be implemented inside the compiler, including recovery from compiler internal errors, validation with user-provided validation suite, and recovery from inter-procedural analysis and optimization errors.

Figure 4:
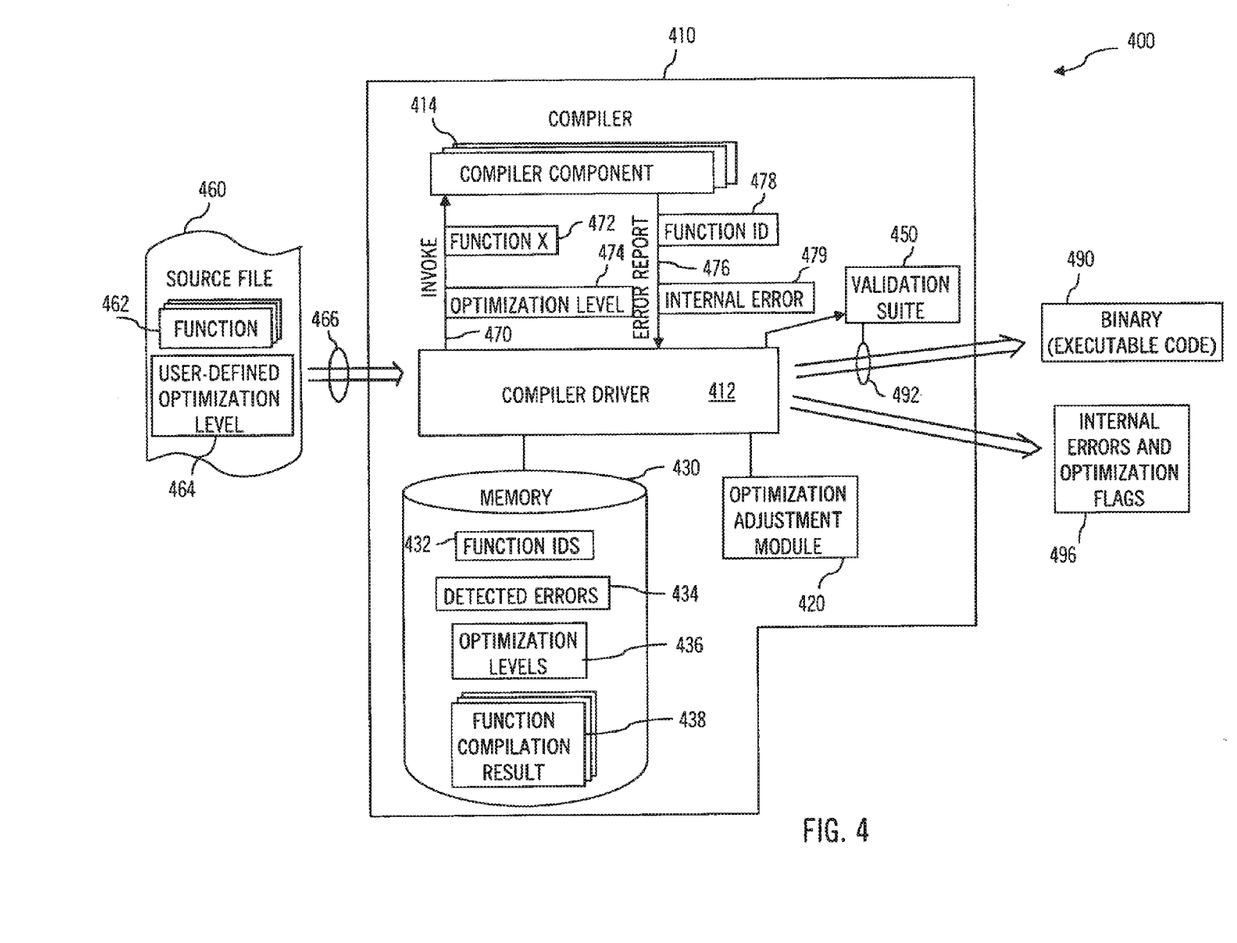
FIG. 4 illustrates a compiler adapted for providing automated optimization level adjustment to address internal errors and showing data flow during use of such a compiler.

FIG. 4 illustrates a compilation method/data flow 400 using a compiler 410 that is adapted to provide automated optimization level adjustment on a function-by-function (or procedure, routine, or subset of a program) basis. The compiler 410 may be used in the system 100 of FIG. 1 and the optimization module 420 and other components/functions shown may be provided in conjunction with the compilation error correction components/functions described above. As shown, the compiler 410 includes a compiler driver 412 that may use or invoke a number of compiler components 414 such as a syntax parser, a linker, or other frontend or backend components to compile a source file 460 provided 466 by a user. The source file 462 may include a number or plurality of individual functions 462 and a set of optimization options 464 (e.g., an optimization level may include a set of optimization options taken together) that the user has chosen for compilation of the file 460.

The compiler 410 further includes an optimization adjustment module 420 that may act to identify the functions 462 in the received 466 source file and to assign, at least initially the user-defined optimization level or flag 464 to each of these functions 462. The compiler 410 further includes or has access to memory 430 (e.g., may be memory or data storage in a computer running the compiler 410), and the compiler driver 412 may store function identifiers 432 in the memory 430 for the functions 462 as well as detected internal errors 434 for each function and the applied optimization levels 436 for each function 462 (e.g., optimization levels are applied according to some embodiments on a function-by-function basis rather than on a file basis). Additionally, the driver 412 may store compilation results 438 for each function that it later merges to create a compilation output or binary 490. The user may provide a validation suite 450 that the driver 412 may use to validate 492 the merged compilation results 438 prior to outputting the final code 490. The output may also include a reporting 496 of identified/corrected internal errors and/or the optimization levels or flags utilized for each of the functions 462 to obtain successful compilation or that were applied at a time of unsuccessful compilation (e.g., a function may not compile successfully even at a lowest level of optimization).

Briefly, during use, the compiler driver 412 may invoke 470 one or more compiler components 414 to compile each function 472 and provide at this time an optimization level/flag 474 to be utilized by component 414. When compilation is unsuccessful at this optimization level, the component 414 may provide an error report 476 that provides an identification 478 of the function being compiled along with each internal error 479 that was identified/experienced by the compiler component 414. The optimization adjustment module 420 may then determine a new optimization level 474 for use in invoking the compiler component 414 again (or in an iterative manner) for the function 472 until compilation is successful or is unsuccessful even at the lowest (or lowest acceptable for the function) optimization level.

In some embodiments, compiler restructuring or design of the compiler 410 may involve the compiler component or backend being restructured as shown so that the compilation unit (e.g., unit 472) is a function (or procedure, routine, or subsection of an overall user file or program). The driver 412 may implement an interface such that the driver 412 may instruct 470 a component 414 to work on a particular function 472 with a certain optimization level 474 (that is set by the optimization adjustment module 420 which may provide the interface within the driver 412). When there is a compiler internal error, the component 414 may be able to report 476 back to the driver 412 which function 478 it is currently working on. The driver 412 may have a database 430 associated with it to store/remember all past decisions such as detected errors 434, applied optimization levels 436, and the like. The final result 490 (e.g., an object file) is produced by the driver 412 by merging the compilation results 438 from the compiler components 414 for all functions 462. A particular function in a file 460 may be compiled more than once if needed, and the latest compilation result 438 may replace an older or prior result for that particular function to produce a new final result/output 490.

The compiler 410 is adapted to facilitate recovery from compiler internal errors. During the compilation 400, if one component 414 produces an internal error(s) 479, the driver 412 receives information about which function is currently under compilation. The driver 412 then may use the optimization adjustment module/interface 420 to determine a present optimization level 436 and act to lower the optimization level for that function. The driver 412 may then again call 470 the compiler component 414 providing the function 472 and a new, lower optimization level 474 for use in compilation. For example, the original optimization level 464 provided or assigned by the user may have been an aggressive optimization level (such as level four optimization on a one to four scale with four being the most aggressive optimization by a compiler component), and the optimization adjustment module 420 may select a lower or less aggressive optimization level (such as three, two, or one in a one to four optimization level implementation).

The compiler component 414 recompiles the function 472 with the new optimization level 474 to check whether the compilation process can succeed with a lower optimization level for this particular function (with the other functions handled separately such as at the original higher optimization level 464). If the compilation still fails, the process 400 may repeat until either the compilation is successful or the lowest optimization level is used (but compilation still fails with the component for this function). If the compiler internal error (e.g., a wrong transformation, a binary that creates a wrong result, or the like) 479 persists at the lowest optimization level 436, the compilation process 400 may fail. Otherwise, the driver 412 may proceed with the compilation of the other functions starting with the original optimization flags 464. The process 400 is repeated until all functions 464 in the input file(s) 460 have been compiled, and then these results 438 are merged to produce a final output or binary 490.

When a validation suite or tool 450 is provided, the validation test suite 450 may be run 492 with the generated binary 490. If the results validate, the binary 490 and optimization level change information 496 may be output or presented to a user/programmer and the compilation process 400 completes successfully. If the validation fails, the driver 412 may try to recompile the application using the following approach. The driver 412 using the optimization adjustment module 420, for example, may lower the optimization level for certain functions 462 in the file 460 (as described below with reference to FIG. 5) and produce a new binary 490. The validation and reduction in optimization level for one or more (a set of) functions 462 is repeated until the validation process 492 succeeds or the lowest optimization level is applied for all functions 462. If any compiler internal error is produced, the procedure indicated above for handling an internal error for a particular function and compiler component is repeated/applied. Finally, the compiler 410 may report to the user whether the validation succeeds or not, and the options used for the compilation of all functions in all processed source files 460 in reports 496.

Figure 5:
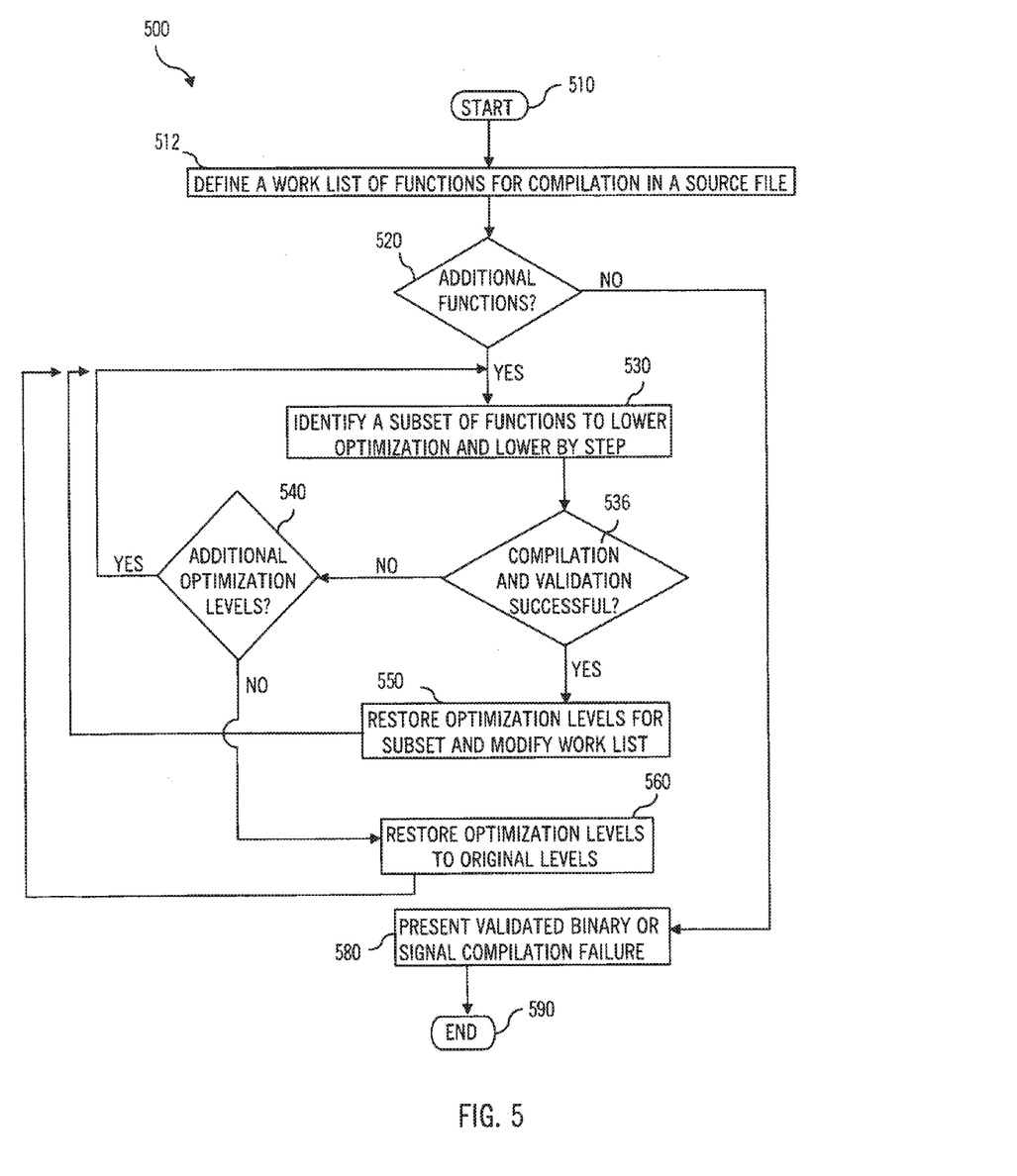
FIG. 5 illustrates a method for providing automated optimization level adjustments of functions within a compiled file upon a failure to validate a binary or compiler output.

Various schemes may be used to find which function's optimization level may be lowered after validation fails to try to achieve optimization and successful compilation of the function. FIG. 5 illustrates one exemplary method 500 for providing automated optimization level adjustment as may be implemented by the compiler 410 of FIG. 4. The method 500 starts at 510 such as by providing an optimization adjustment module in a compiler driver or accessible as such for use in processing a user's submitted file for compilation after a validation test suite has been unable to validate the final output or binary from the compiler driver. As shown, at 512, the method 500 may include defining a work list of functions for compilation from a user-input source file. Note, the technique 500 may be thought of as using a binary search scheme to try to identify which functions may be successfully validated with lower optimization levels.

In step 512, the source file may have "n" functions that have to be compiled in an ordered list (e.g., $F\_1, F\_2, \ldots, F\_n$). This provides a work list that may contain a set of ranges, and each range may define a list of functions. For example, [k1, k2] may define the functions from $F\_\{k1\}$ to $F\_\{k2\}$. Initially, the work list may be defined as WORK=$\{[1, n/2], [n/2+1, n]\}$.

At step 520, the method 500 may include determining whether the work list is empty or if there are additional functions to compile. If empty, the method 500 may determine whether a validated binary exists or whether compilation failed. At step 580, a lastly-produced, good binary may be presented to the user in a compiler output/report. Otherwise, step 580 may include signaling or reporting that compilation failed along with information on the automated steps taken in an attempt to correct the problem with optimization level adjustments.

If the work list is determined to not be empty at 520, the method 500 may continue at 530 with identifying a subset of functions for lowering of optimization levels and then lowering the corresponding assigned optimization level in a stepwise manner. For example, a range, such as a [m1, m2] range, may be extracted from the work list. The optimization level is lowered for this range or for functions $F\_\{m1\}$ to $F\_\{m2\}$. If at 536, it is determined that a good binary can now be produced with successful validation (e.g., run compilation again with compiler components and then validate with the validation suite) the method 500 may continue with step 550.

Otherwise, step 540 is used to determine whether another lower optimization level exists (i.e., can a good binary be produced at all by continuing to lower optimization levels) and if so repeat compilation and validation for the function subset $F\_\{m1\}$ to $F\_\{m2\}$ until a good binary is produced. If a good binary cannot be produced as indicated at 540 the method may continue at 560, with restoring the optimization levels to the original level for functions $F\_\{m1\}$ to $F\_\{m2\}$. At 550 if compilation is successful after lowering of the optimization level at 530, the optimization levels are restored to the original level for the function subset of $F\_\{m1\}$ to $F\_\{m2\}$. Then, work list is modified by putting [m1, (m1+m2)/2] and [(m1+m2)/2+1, m2] into the work list, a 500 continues at 530. Techniques other than this binary search method for particular functions may be used as it should be understood that this approach may not be an optimal solution but it tries to find a good solution for determining which function's optimization level may be lowered with reasonable processing time consumption.

Now, it may be useful to discuss how the optimization adjustment module may facilitate or provide recovery from inter-procedural optimization errors. Modern compilers often have inter-procedural analysis and optimization (IPO). In order for the above-described optimization adjustment module and process to more effectively work with IPO, the compilation may be restructured such that IPO and file/function-based optimizations can be separated and file/function-based optimizations can be called without repeatedly calling IPO.

For example, some IPO implementations may modify input intermediate representation to file/function-based optimizer. Some other IPO implementation may only provide information to file/function-based optimizer, and it is the function-based optimizer's or optimization adjustment module's task to utilize such information and do optimization. If IPO does not modify input intermediate representation, then the file/function-based optimizer with certain optimization level (e.g., the lowest optimization level) may not use such information. If IPO does modify input intermediate representation to file/function-based optimizer, and the compiler using a optimization adjustment module cannot find a good binary, then there are a couple of options. If IPO only applies optimizations with which any input intermediate representation (IR) can be safely replaced with unmodified IR (by IPO), e.g., inlining, then the optimization adjustment schemes described above may be used to selectively change input from IPO-modified to IPO unmodified IR. Otherwise, if IPO may apply any optimization with which IPO cannot safely replace one file's input IR with original unmodified IR, then the IPO optimization may be turned off and all original IPO unmodified IRs may be used.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

With regard to automatic optimization level aspects of the system and method described, a number of advantages or functions that increase its desirability have been discussed. For example, the description explains the flexibility with the automatic adjustment done in the compiler itself and the fact that the adjustment can be applied at a finer granularity (function level, for example, rather than file or whole application level). Another advantage to the automatic optimization level features and processes is that a much finer level of adjustment can be made. In modern compilers, there are hundreds, if not thousands, of sub-options and sub-phases that can be turned on, off, or parametrically adjusted. Most of these are not documented publicly because users simply cannot understand and use all these detailed options efficiently. However, the automatic optimization adjuster can peruse a detailed database to obtain a fine resolution for a particular error.

For example, an internal error might occur during the break-self-cycle optimization within the modulo-scheduling phase of the code generator component of the compiler. In most cases, the only high level resolution available to a user would be to turn down the optimization level or at best to turn off the modulo scheduler completely. The automatic adjuster, however, can be configured to turn off only the specific sub-option that caused the internal error, preserving the vast majority of optimizations. One can think of this as if the user can change the optimization levels from -O5 down to -O4 or -O3 or -O2 or -O1 whereas the built-in adjuster can give you much finer control which may be conceptually thought of e.g., as -O4.956. So, if an error occurs at -O5, the compiler or user does not have to go all the way down to -O4.

To further explain this point, in the above discussion, when the optimization level is adjusted, this does not just necessarily mean, for example, an adjustment from a level of -O5 to a level of -O4. Instead, because of detailed knowledge of the internal components and the nature of the error, the automated optimization adjustment performed within the compiler to address internal errors may include or provide the ability to adjust the optimizations used at a much finer level. For example, the process may involve stating that -O5-InternalFlag-CompilerInternalSuboptimizationName=OFF to get all the -O5 optimizations with the exception of a particular sub-optimization that caused an error. Hence, in the above description when automatic lowering of the optimization level is discussed and described, this is intended to also mean that such automated optimization level adjustments may be done at a very fine level.

We claim:

1. A compilation method for correcting internal compiler errors that may include compiler internal failures and errors produced by running a validation suite, comprising:
running a compiler on a computer;
receiving a source file by the compiler;
identifying a set of functions in the source file, wherein each of the set of functions in the source file is a procedure or a routine provided in code of the source file;
storing a set of optimization levels for each of the set of functions in the source file in a memory accessible by the compiler;
using an optimization adjustment module to assign an original optimization level for each of the set of functions in the source file;
using a plurality of compiler components to compile each of the set of functions in the source file using the originally-assigned optimization level, wherein the compiling of each of the set of function in the source file comprises, when an internal error occurs for one of the set of functions in the source file, reporting the internal error along with an identification of the one of the set of functions in the source file being compiled to a compiler driver;
using the optimization adjustment module to process the internal error reported for the one of the set of functions in the source file including assigning an adjusted optimization level for the one of the set of functions in the source file, wherein the adjusted optimization level is selected from the stored set of optimization levels for the one of the set of functions in the source file in the memory and is a lower level of optimization than the originally-assigned optimization level for the one of the set of functions in the source file; and
repeating the compiling of the one of the set of functions in the source file using the adjusted optimization level and using the originally-assigned optimization level for other ones of the set of functions in the source file.

2. The compilation method of claim 1, further comprising repeating the compiling and the processing steps until the one of the set of functions in the source file is successfully compiled by the plurality of compiler components.

3. The compilation method of claim 2, wherein the compiling is halted upon a determination by the optimization adjustment module that the adjusted optimization level is a lowest level of optimization of the stored set of optimization levels for each of the set of functions in the source file and when the compiling is unsuccessfully performed by the plurality of compiler components.

4. The compilation method of claim 1, wherein the compiling step is performed independently for each of the set of functions in the source file whereby a compilation unit is one of the set of functions in the source file, wherein each of the set of functions in the source file has an optimization level assigned by the optimization adjustment module that is selected from the stored set of optimization levels for each of the set of functions in the source file in the memory, and wherein the optimization level is equal to or lower than the originally-assigned optimization level for each of the set of functions in the source file.

5. The compilation method of claim 1, further comprising repeating the compiling step using a lower optimization level than the originally-assigned optimization level for the one of the set of functions in the source file, generating a final binary by merging compilation results of each of the set of functions in the source file, and reporting the internal error and the lower optimization level.

6. A computer program product comprising software stored in a memory adapted for compiling a source file into an executable binary with automated internal error correction, the software comprising:
computer readable program code causing a computer to receive a source file comprising a plurality of functions;
computer readable program code causing the computer to compile the plurality of functions of the source file including identifying errors;
computer readable program code causing the computer to modify a compilation environment of the source file to correct the errors;
computer readable program code causing the computer to perform a validation of the compiled plurality of functions of the source file prior to compiling the source file using the modified compilation environment of the source file; and
computer readable program code causing the computer to compile the source file using the modified compilation environment of the source file,
wherein the errors comprise an internal error associated with one of the plurality of functions of the source file, wherein the modifying of the compilation environment of the source file comprises adjusting an optimization level for compiling the associated one of the plurality of functions of the source file, and wherein the adjusted optimization level is selected from a stored set of optimization levels for the associated one of the plurality of functions of the source file and is a lower level of optimization than an originally-assigned optimization level for the associated one of the plurality of functions of the source file.

7. The computer program product of claim 6, wherein the errors comprise a syntax error, and wherein the modifying of the compilation environment of the source file comprises modifying syntax of the source file.

8. The computer program product of claim 6, wherein the errors comprise a linking error, and wherein the modifying of the compilation environment of the source file comprises modifying linking within the source file.

9. The computer program product of claim 6, further comprising computer readable program code causing the computer to store a record of applied changes to the compilation environment of the source file, and to generate a report including the errors and the applied changes to the compilation environment of the source file to correct the errors.

10. A compilation method for correcting internal compiler errors that may include compiler internal failures and errors produced by running a validation suite, comprising:

running a compiler on a computer;

receiving a source file by the compiler;

identifying a set of functions in the source file, wherein each of the set of functions in the source file is a procedure or a routine provided in code of the source file;

storing a set of optimization levels for each of the set of functions in the source file in a memory accessible by the compiler;

using an optimization adjustment module to assign an original optimization level for each of the set of functions in the source file;

using a plurality of compiler components to compile each of the set of functions in the source file using the originally-assigned optimization level, wherein the compiling of each of the set of function in the source file comprises, when an internal error occurs for one of the set of functions in the source file, reporting the internal error along with an identification of the one of the set of functions in the source file being compiled to a compiler driver;

using the optimization adjustment module to process the internal error reported for the one of the set of functions in the source file including assigning an adjusted optimization level for the one of the set of functions in the source file, wherein the adjusted optimization level is selected from the stored set of optimization levels for the one of the set of functions in the source file in the memory and is a lower level of optimization than the originally-assigned optimization level for the one of the set of functions in the source file; and repeating the compiling using the lower optimization level instead of the originally-assigned optimization level for the one of the set of functions in the source file.

11. The compilation method of claim 10, further comprising generating a final binary by merging compilation results of each of the set of functions in the source file, and reporting the internal error and the lower optimization level.

12. The compilation method of claim 10, further comprising repeating the compiling and the processing steps until the one of the set of functions in the source file is successfully compiled by the plurality of compiler components.

13. The compilation method of claim 12, wherein the compiling is halted upon a determination by the optimization adjustment module that the adjusted optimization level is a lowest level of optimization of the stored set of optimization levels for each of the set of functions in the source file and when the compiling is unsuccessfully performed by the plurality of compiler components.

14. The compilation method of claim 10, wherein the compiling step is performed independently for each of the set of functions in the source file whereby a compilation unit is one of the set of functions in the source file.

15. The compilation method of claim 10, wherein each of the set of functions in the source file has an optimization level assigned by the optimization adjustment module that is selected from the stored set of optimization levels for each of the set of functions in the source file in the memory, and wherein the optimization level is equal to or lower than the originally-assigned optimization level for each of the set of functions in the source file.

* * * * *